United States Patent

Metcalfe et al.

[15] 3,678,141

[45] July 18, 1972

[54] PROCESS FOR COLORING EPOXY PLASTIC EYEGLASS FRAMES AND PARTS THEREOF

[72] Inventors: Richard T. Metcalfe, Sturbridge, Mass.; Harry D. Crandon, Wootstock, Conn.

[73] Assignee: American Optical Corporation, Southbridge, Mass.

[22] Filed: April 16, 1969

[21] Appl. No.: 816,822

[52] U.S. Cl. ............................. 264/22, 117/93.13, 260/37, 260/67, 264/73, 264/234, 264/245, 264/331
[51] Int. Cl. .................. B29c 9/00, B29c 25/00, C08g 51/04
[58] Field of Search .............................. 264/73–77, 245, 264/331, 234, 22, 25, 26–27, 23; 260/37 EP, 67 EP; 96/89; 117/93.13

[56] References Cited

UNITED STATES PATENTS

| | | | |
|---|---|---|---|
| 2,480,749 | 8/1949 | Marks | 264/22 |
| 3,030,329 | 4/1962 | Warnsdorfer | 260/37 |
| 3,118,858 | 1/1964 | Frey et al. | 260/37 |
| 3,167,441 | 1/1965 | Pugin | 260/37 |
| 3,306,956 | 2/1967 | Barnette | 264/245 |
| 3,315,019 | 4/1967 | Fischler | 264/73 |
| 2,365,416 | 12/1944 | Kühne | 96/89 |

FOREIGN PATENTS OR APPLICATIONS

| 1,224,910 | 9/1966 | Germany | 264/331 |
|---|---|---|---|

Primary Examiner—Robert F. White
Assistant Examiner—Jeffery R. Thurlon
Attorney—William C. Nealon, Noble S. Williams and Robert J. Bird

[57] ABSTRACT

A process for coloring epoxy plastic resins for eyeglass frames and parts thereof adds dyes or pigments to one or more of the liquid resin precursors or the liquid hardeners immediately prior to casting. Variegated patterns and other color effects may be made by metering two or more colors together with the resin precursors at the casting operation. Translucent colors are made by using solvent soluble dyes added to the resin precursors, opaque colors may be made by adding pigments to the precursors, and demi-shades are made by bleaching the dye cured resin at certain areas of the frames by exposure by heat or ultraviolet radiation.

1 Claim, No Drawings

PROCESS FOR COLORING EPOXY PLASTIC EYEGLASS FRAMES AND PARTS THEREOF

A principal object of the present invention is to provide colored epoxy resin eyeglass frames and parts thereof.

Another object of the invention is to provide a process for coloring epoxy resins which are cast into eyeglass frames and/or parts thereof.

A further object of the invention is to provide a process for producing translucent colored epoxy resin eyeglass frames and parts thereof, particularly providing color which extends completely through the epoxy resin.

A still further object of the invention is to provide a process for producing an opaque colored epoxy resin eyeglass frame and parts thereof, particularly to a process for producing colors which extend throughout the body of the plastic.

Yet another object of the invention is to provide a process for producing variegated colors and other special effects in epoxy resin eyeglass frames and parts thereof.

According to the present invention there is provided a colored epoxy resin, or polymer, ophthalmic mounting for eyeglass frame and parts thereof, and a process for coloring such eyeglass frames. The process provides including into the liquid precursors of the resin, solvent soluble dyes and pigments in various amounts, various combinations and of various types for producing variously colored eyeglass frames.

The objects and advantages states above may be ascertained from the following disclosure, setting forth specific examples which are intended for illustrative purposes only.

The epoxy resins which are useful for casting according to the present invention are prepared from phenols, which are at least dihydric, an epoxy-yielding compound, and a hardener. Among the phenols which may be used are bisphenol A, catechol, resorcinol, pyrogallol, phyloroglucinol and the like. The epoxy compound may be any of the known epoxy-yielding compounds, however, epichlorohydrin is the compound of choice, mainly because of economics and availability. The hardeners may be various types of aliphatic and aromatic amines including polyfunctional aliphatic amines such as diethylene and triethylene amines, various complex and adduct amines including high molecular weight aliphatic amine adducts, polyamines, aromatic diamines, mercaptan-terminated saturated elastomers, which are liquid Thiokols, dibasic anhydrides, aromatic anhydrides, amides and the like. It is important, however, since the resulting eyeglass frames and parts are in contact with the skin of the user the cured resin must be non-toxic, in addition to being flexible.

Opaque and translucent colors are prepared by incorporating dyes or pigments into the resin or the hardener immediately before casting. Various demi-shades are produced by bleaching the dye in the cast object in certain areas by exposure to heat or ultraviolet radiation. Variegated patterns may be obtained by metering two or more colors with the resin-hardener mixture as they are cast into a mold. A variegated colored frame may, also, be prepared by adding a solvent soluble dye stuff into the hardener before it is mixed with the resin, and then casting a frame with a substantially uniform color. The cured frame is variegated by selectively heating particular areas of the frame to a temperature, for example, in the area of 300°–375° F., (depending on the selected coloring agent) to wash out the color and end up with demi-shades of the original color.

As a specific example of an epoxy resin suitable for making eyeglass frames, 100 parts of Hysol R9–3029 made by the Hysol Chemical Company of Olean, N.Y. and 30 parts of amine type hardener made by the Hysol Chemical Company sold under the name of H2–3561 are mixed together, and then poured into a mold having the desired shape cavities. The mold is then heated to about 170° to 200° F. to cure the precursors into an epoxy resin. Alternatively, the mold may be preheated to about 170° to 200° F.

Solvent soluble dyes may be added to the hardener prior to its mixing with the resin precursor. For example, a small amount of solvent soluble dye Zapon Black-X made by the American Hoechst Corporation of Mountainside, N.J., was added to the hardener prior to mixing with resin. After the resin and the hardener were cast, the result was a very black frame. When the frame was heated to a temperature of about 300° F. in a small area, a noticeable change in the color density was effected. This gave a demi-colored frame. A brown frame may be made by mixing a small amount of brown BL dye, made by the same corporation, into the hardener prior to the casting. The resulting color of the frame is a very dark brown, which is almost black.

A brown frame was made by adding ¼ of 1 percent of weight of orignal brown G dye to the hardener, which is on a basis of 0.10 grams to 40 grams of hardener. The hardener is added to the resin and the total is then cast. The result in casting was a very dark brown which was almost black. In another case ⅛ of 1 percent of the Origal brown G dye is added to the hardener and the finished eyeglass was a lighter brown. In still another cast 0.10 of 1 percent of Origal brown G dye was added to the hardener on the basis of 0.05 grams of dye to 50 grams of hardener. After casting the epoxy frame had a good brown color.

In another example, 0.1 percent of Origal brown BL was added to the hardener, and the subsequent epoxy frame provided a good density of color which was transparent brown. All the above dyes were manufactured and sold by the American Hoechst Corporation.

In another cast, white pigment dispersent is added to hardener Hysol number DP3–4463, made by the Hysol Chemical Company and resin, and to hardener DP8–4308 and resin was added black dispersent pigment. Alternate portions of each were poured into the mold, and the alternation was repeated until the mold was filled. The resultant cured epoxy frame was formed of layers of different colors.

Various types of dye stuff may be used for coloring the eyeglass frames, these including (products of the American Hoechst Corporation) brilliant spirit black HK, Zapon Black X, patent Blue V, Blue II, Naphthalene Green V as well as various other Zapon fast dye stuffs. Various spirit soluble azo dyes, lacking $-SO_2OH$ groups, etc. are also usable for coloring the epoxy resins, forming translucent frames and parts. Fat soluble dyes compatible with the system may be used. Pigments include inorganic materials, finely ground which are suspended in the liquid resin precursors. The viscosity of the liquid is sufficient to retain the pigments in suspension during the casting, particularly where they are added immediately prior to the filling of the molds. The dyes are used in very small amounts, being substantially less than 1 percent of the hardener, and the pigments are similarly used in a small amounts. In some instances, it may be desirable to dissolve the dye in the hardener, and maintained as a colored precursor, however, the case of coloring permits a single supply of the colorless hardener which is colored as used. This reduces inventory problems.

What is claimed is:

1. A method of coloring epoxy resin eyeglass frames and parts thereof manufactured from liquid ingredients, an epoxy composition and a hardener, comprising the steps of adding small amounts of a coloring agent selected from spirit soluble azo dyes and finely divided pigmenting material to at least one of the liquid ingredients immediately prior to casting the liquid ingredients, metering the liquids into a mold having cavities therein in the form of eyeglass frames and parts thereof, completely curing the liquid ingredients and included coloring agent in the mold to produce a self-sustaining, completely polymerized colored eyeglass frames or parts thereof, removing the colored polymerized eyeglass frames or parts thereof from the mold, and subjecting selected portions of the colored polymerized eyeglass frames or parts thereof to heat or ultraviolet irradiation to chemically bleach selected areas of the frame and parts thereof to produce demi-shades in the colored polymerized eyeglass frames or parts thereof.

* * * * *